Patented Nov. 1, 1932

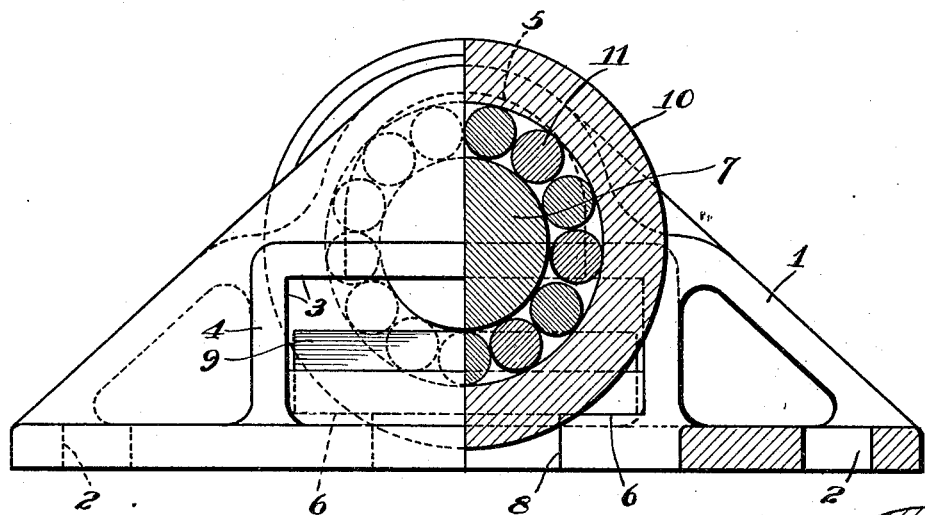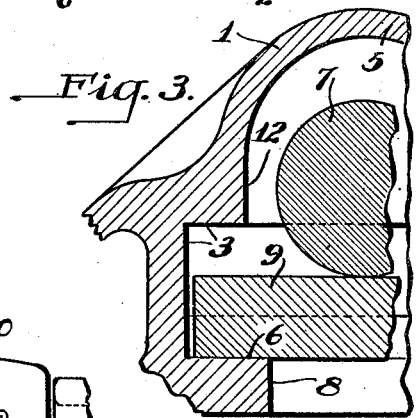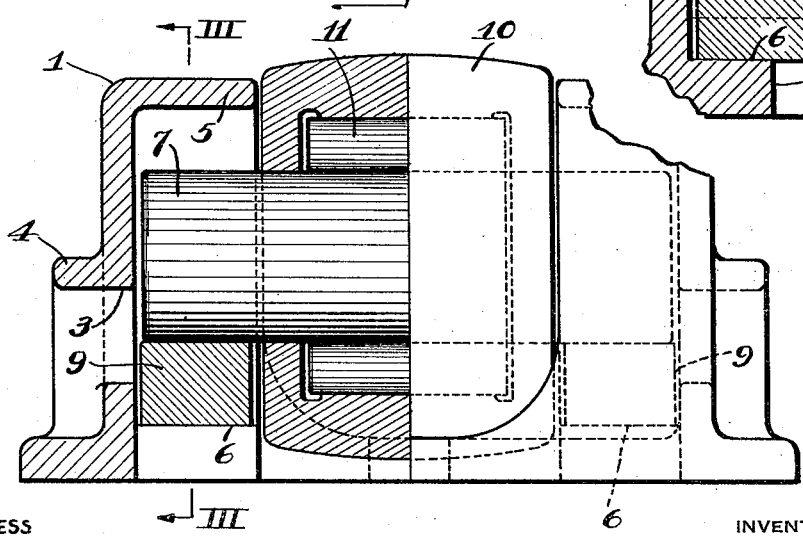

1,886,254

UNITED STATES PATENT OFFICE

FRANKLIN T. REESE, OF PITTSBURGH, PENNSYLVANIA, ASSIGNOR, BY MESNE ASSIGNMENTS, TO CONTINENTAL ROLL & STEEL FOUNDRY COMPANY, OF WILMINGTON, DELAWARE, A CORPORATION OF DELAWARE

SIDE ROLLER BEARING

Application filed August 21, 1928. Serial No. 301,019.

This invention relates to side roller bearings for railway vehicles, more particularly to side roller bearings which are disposed between the truck frame and car bolster to provide freedom of movement of the vehicle body.

It is among the objects of this invention to provide side roller bearings of simple and durable mechanical construction embodying a minimum number of parts which are readily assembled and which are accessible for inspection and renewal.

Another object of this invention is to provide a side roller bearing which is constructed in such manner that when the several parts are assembled in their proper positions, they will be interlocked without the use of clamps, or bolts.

Another object of the invention is to provide for adjustment of the height of the roller bearing whereby side roller bearings of different heights may be constructed of a standard base and roller unit.

Another object of the invention is the provision of a side roller bearing which is especially efficient in its operation by virtue of its manner of mounting in its support to permit freedom of movement of the vehicle body supported thereon in any direction in a horizontal plane.

These and other objects will become apparent from a consideration of the accompanying drawing in which like reference characters designate like parts and in which Fig. 1 is a sectional elevational view of a side roller bearing embodying the principles of this invention; Fig. 2 is a similar view taken transversely of the view in Fig. 1; and Fig. 3 a cross sectional view taken along the line III—III, Fig. 2.

Referring to Fig. 1 of the drawing, the structure therein illustrated comprises an integrally cast base 1 provided with openings 2 adapted to receive bolts (not shown) by which it is secured to the truck frame. The base is provided with a pair of slotted openings 3 which are reinforced by a web 4. The side walls of the base in which the slots 3 are provided terminate at their top portions into horizontal flanged members 5 which are in alinement with shoulders 6 at the bottom of the base to constitute a housing for a roller shaft 7.

The base 1 is further provided with an opening 8 at the shoulder 6 as shown in Fig. 1 of the drawing for the purpose of receiving the shaft 7 which is passed through the slot 8 of the base and supported on a pair of bearing plates or blocks 9 which are supported on shoulder 6 as shown. The bearing plates 9 are of any suitable thickness less than the width of the slots 3 and are slightly shorter than the length of the slots 3. The bearing blocks are inserted in the slots 3 and placed upon their supporting shoulder 6 after the roller bearing shaft 7 has been raised through the slot of the base to a position above the height of slots 3, and when bearing plates 9 are assembled in the manner stated, the shaft 7 is held in its assembled position.

The distance from the top of roller 10 to the bottom portion of base 1 may be varied by employing bearing blocks 9 of different thicknesses within the limits of the slots 3. Thus a standard base and roller unit may be utilized for constructing side roller bearings of different heights.

A roller 10 may be loosely mounted on the shaft 7 in the manner shown and provided with roller bearings 11 which are disposed between shaft 7 and roller 10 to permit relative rotary movement of said members, or the rollers 10 may be journalled directly on shaft 7 if desired.

When the construction is as shown, the roller is assembled in the base member by disposing the anti-friction rollers 11 in the hollow portion thereof and inserting shaft 7 centrally of said anti-friction rollers. The shaft 7 is then inserted through slot 8 of the base and raised to a position above the slots 3 as previously explained, to permit inserting the bearing blocks 9 through the slots 3 to their position on the shoulder 6. When the shaft 7 is subsequently lowered on bearing blocks 9, the assembled roller 10, anti-friction rollers 11 and shaft 7 cannot be displaced in any manner whatsoever, even though the vehicle on which they are mounted is upset as is frequently the case. The parts are dismembered by first raising the roller bearing to a position which will permit lifting the bearing block 9 out of the base through the slots 3 and the shaft 7 carrying the roller 10 is subsequently dropped through the slot 8 and dismembered.

The operation of my device is briefly as follows:—The roller 10 is adapted for engagement with a bearing plate (not shown) secured to the underside of the vehicle body and when so engaged permits infinite rolling contact with the upper bearing plate when the roller is constructed as shown in the drawing, namely, of the anti-friction bearing type. Normally, however, the roller is designed to permit a rolling movement of shaft 7 on the bearing blocks 9 within the limits of the shoulders 12 shown in Fig. 3 of the drawing. Within the limit of movement of these shoulders the normal displacement of the vehicle body and truck is effected. If however movement of the vehicle body is in excess of the limits of the slots, the roller 10 may turn without damage to the supporting bearing blocks.

I prefer to construct the supporting base 1 of cast steel and utilize mild steel for the bearing 9, shaft 7 and anti-friction roller 11 as for example cold rolled steel of standard gauge thus making the cost of the unit comparatively low without impairing its efficiency. Such parts as may become worn, can be readily replaced without the aid of special tools and without requiring a skilled workman.

It will be evident from the foregoing description of this invention that side roller bearings made in accordance therewith, provide a point contact with sufficient clearance to allow free movement of the bearing shaft with a minimum amount of friction.

Although I have described one embodiment of my invention it will be obvious to those skilled in the art that various modifications may be made in the details of construction without departing from the principles of the invention herein set forth.

I claim:

1. A side roller bearing comprising an integral base, a roller mounted for rolling movement therein and bearing plates disposed in said base, said base being provided with slotted openings through which the bearing plates are inserted and off-set shoulder portions in which the bearing plates are retained by contacting with the sides of the roller itself when in assembled position.

2. A side roller bearing comprising an integral base having a slotted opening in the bottom thereof for receiving a roller bearing and having slotted openings in the side walls thereof for receiving bearing plates and a roller mounted for rolling movement on and between said bearing plates.

3. A side roller bearing comprising an integrally cast base having a slotted opening in the bottom thereof and slotted openings in the side walls, a roller comprising a shaft, a roller sleeve having integral side walls disposed on said shaft and a plurality of anti-friction rollers disposed between said sleeve and shaft, said roller being inserted in the slotted opening through the bottom of the base and held in its operative position by bearing plates which are disposed through the slotted openings in the side of said base and adapted to support the ends of said shaft.

4. A side roller bearing comprising a base having integral side walls with slotted openings therein, and having longitudinal flange members extending inwardly from said walls, a bearing member adapted for rolling movement on a shaft between said flanges and base, and bearing blocks adapted to be inserted through the openings of the side walls to retain said bearing member in its operative position and to constitute a bearing support for the shaft of the roller.

5. A side roller bearing comprising a base having recesses forming a bearing support and having integral side walls with slotted openings therein, a shaft adapted for rolling movement within the limits of said recessed portions, a main roller bearing journalled on said shaft, and bearing blocks adapted to be inserted in the slotted openings of the side walls to provide renewable bearing supports for said shaft.

In testimony whereof, I have hereunto set my hand.

FRANKLIN T. REESE.